March 21, 1950 E. B. NOEL 2,501,405
PHOTOGRAPHIC LAMP UNIT
Filed Sept. 7, 1945
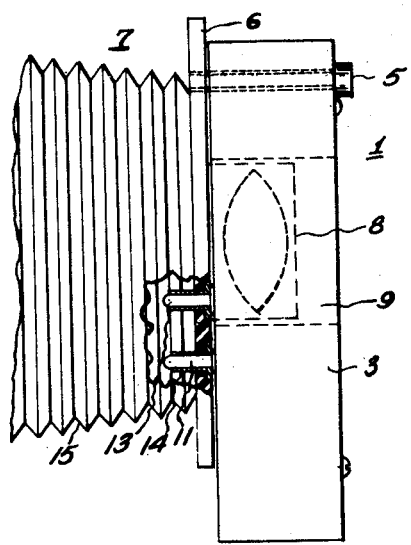
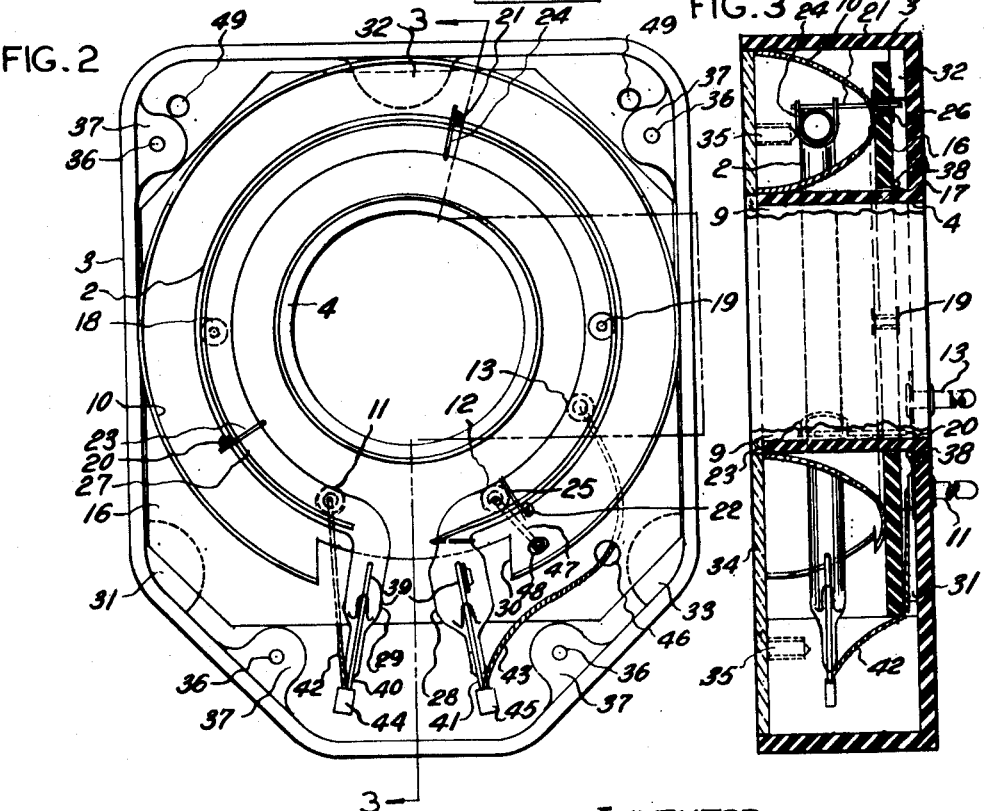
INVENTOR:
EDWARD B. NOEL
BY John H. Anderson
HIS ATTORNEY Patented Mar. 21, 1950

2,501,405

UNITED STATES PATENT OFFICE 2,501,405

PHOTOGRAPHIC LAMP UNIT

Edward B. Noel, Cleveland Heights, Ohio, assignor to General Electric Company, a corporation of New York Application September 7, 1945, Serial No. 615,007

5 Claims. (Cl. 240—1.3)

My invention relates to lamp units for furnishing illumination for photography and its principal object is to provide such a unit of simple, compact structure readily mountable on a photographic camera. Other objects and advantages of my invention will appear from the following detailed description of species thereof and from the appended claims.

In the drawing accompanying and forming part of this specification an embodiment of the invention is shown in which Fig. 1 is a fragmentary, side-elevational view of a photographic camera showing my lamp unit mounted on the lens-board of the camera; Fig. 2 is an enlarged, front elevational view of the lamp unit shown in Fig. 1 with the front cover removed, and Fig. 3 is a sectional view along the line 3—3 of Fig. 2 and with the cover in place.

The lamp unit 1 shown in the drawing comprises a circular lamp 2 (Figs. 2 and 3) mounted in a shallow, open face housing 3 which has a tubular reentrant wall 4, about which the lamp 2 is mounted. The housing 3 is removably secured by bolts 5 (Fig. 1) to the lens-board 6 of a camera 7 with the lens-piece 8 of the camera extending into the aperture 9 defined by the reentrant wall 4 of the housing 3. The circular lamp 2 provides flashes of light for photographing objects and the aperture 9 extends through the housing 3 and allows light reflected by the object to pass to the camera lens 8. A trough-shaped annular reflector 10 is mounted in back of the lamp 2 for increasing the illumination on the object to be photographed.

The housing 3 consists of opaque, electrically insulating material, such as an organic plastic, and has three spaced contact pins 11, 12 and 13 extending outwardly from its back surface a sufficient distance to engage sockets 14 (Fig. 1) which may be included in a circuit comprising an electric power source suitable for flashing the lamp 2. The sockets 14 are disposed in suitable openings in and are flush with the front of the lens-board 6 of the camera. The connections from the sockets 14 to the power source may pass through the interior of the bellows 15 of the camera 7.

The lamp 2 and the reflector 10 are mounted on a plate 16 of electrically insulating material, such as an organic plastic. The plate 16 has an opening 17 through which extends the reentrant wall 4 of the housing 2 when the lamp unit 1 is assembled. The reflector 10 is secured to the plate 16 by a pair of eyelets 18 and 19 and with its opening indexed with that in the plate 16. The lamp 2 is supported within the reflector 10 by three stiff metal wire supports 20, 21 and having wire loops 23, 24 and 25 which pass around and engage the envelope of lamp 2. The wire supports 20, 21 and 22 pass through openings in the reflector 10 and are secured to the plate 16 by eyelets 26 to which their ends are attached as by solder. Rotation of the lamp 2 in the wire supports is prevented by a circular wire 27 extending along the lamp envelope, attached to the wire supports and having one end wrapped around a part of the envelope adjacent an electrode chamber 28 of the lamp 2. The electrode chambers 28 and 29 which extend outwardly from the center of the circular lamp are thus held in proper position in the opening 30 in the outer side of the reflector 10.

The mounting plate 16 is supported and spaced from the bottom of the housing 3 by three shoulders 31, 32 and 33 against which it is held by the housing cover 34 which is open over the aperture 9 and engages the reflector 10 which has edges flush with the rim of the reentrant wall 4 (Fig. 3). The cover 34 is secured to the housing 3 by four bolts 35 which pass through the cover, into threaded cavities 36 in the four posts 37 and hold the cover 34 against the top of the posts 37. The cover 32 consists of electrically insulating transparent material, such as methyl methacrylate, and constitutes a window which transmits light from the lamp 2 to the object to be photographed. The edges of the mounting plate 16 rest against the sides of the posts 37. The mounting plate 16 and the lamp 2 and reflector 10 supported thereby are thus firmly held in the position in the housing 3. A circular pressure spring 38 may be provided between the plate 16 and the bottom of housing 13 to force the assembly consisting of the plate 16, lamp 2 and reflector 10 against cover 34 if there is any play between the assembly and the housing. This avoids rattling of the assembly in the housing.

The electrode chambers 28 and 29 of the lamp 2 enclose discharge supporting electrodes 39 mounted on current leading-in wires 40 and 41 which are hermetically sealed to and pass through the wall of the chambers 28 and 29. The exposed outer ends of the leading-in wires 40 and 41 are connected to the contact pins 11 and 13, respectively, of the housing 3 by the conductors 42 and 43, which are soldered as shown at 44 and 45 to the wires 40 and 41. The conductor 42 passes directly under the mounting plate 16 while the conductor 43 extends along the top of, passes through the opening 46 in and then under the mounting plate 16 to the pin 13. A third conductor 47 is secured to the reflector 10 by the eyelet 48, passes through and is soldered into the eyelet 26 holding lamp support 22 and is attached to the third contact pin 12 on the housing 3. The lamp support wires 20, 21 and 22 and the circular wire 27 may thus be charged to facilitate starting of the lamp. The bolts 5 pass through holes 49 in the housing 3 (Fig. 2) and through similar holes in the cover 34.

The contact pins 11, 12 and 13 are adjacent the aperture 9 which accommodates the camera lenses 8 and thus may pass through the lensboard 6 of the camera 7 which is smaller in area than the back of the housing 3. The parts of the lamp unit 1 electrically charged to different potentials are spaced sufficiently to prevent arcing between said parts. The reflector 10 and the lamp supports 20 to 25 as well as the circular wire 27 are electrically connected together and are all at the same potential when current is applied to the pin 12 and conductor 47 so that there is no possibility of arcing between these members. The electrically charged parts inside of the lamp unit 1 are completely enclosed by the electrically insulating housing 2 and its cover 34 to protect the user against accidental contact with such parts.

The discharge lamp 2 is of a well known type and is filled with an ionizable gaseous atmosphere, such as xenon at a pressure of 100 mm., which, when an electric discharge is produced therein, emits a brilliant flash of light for taking photographs. The auxiliary apparatus for the lamp 2 and the details of structure and operation of the lamp have not been described since these are known and constitute no part of my invention.

What I claim as new and desire to secure by Letters Patent of the United States is:

1. In a photographic lamp unit for mounting on a camera lens board, the combination of an open face electrically insulating housing having a reentrant wall defining an aperture through the housing for accommodating a camera lens piece, external electrical contacts on the back of and extending into the housing for connecting the unit to a suitable electric power source and an assembly in said housing comprising an electrically insulating mounting plate over the contacts and having upstanding conductive supports arranged around the reentrant wall, an electric discharge flash lamp tube of circular shape mounted on said supports and an annular conductive reflector mounted on said plate in back of said lamp facing the opening in said housing and providing openings for the lamp supports, said housing having shoulders for spacing said plate from its back wall, and a light transmitting removable cover engaging the reflector and holding the plate against said shoulders, said unit comprising also current leads passing between said plate and said back wall and connecting said reflector and the lamp terminal to said contacts.

2. In a photographic lamp unit for mounting on a camera lens board, the combination of an open face electrically insulating housing having a reentrant wall defining an aperture through the housing for accommodating a camera lens piece, external electrical contacts on the back of and extending into the housing for connecting the unit to a suitable electric power source and an assembly in said housing comprising an electrically insulating mounting plate over the contacts and having upstanding conductive supports arranged in a circle around said reentrant wall, an electric discharge flash lamp tube of circular shape mounted on said supports and an annular conductive reflector mounted on said plate in back of said lamp facing the opening in said housing and providing openings for the conductive supports which it electrically connects together, and a current lead passing through said plate and connecting said reflector to a housing contact for conducting an electric charge to said reflector and the lamp supports to facilitate starting of the discharge in the lamp.

3. In a photographic lamp unit for mounting on a camera lens board, the combination of an open face electrically insulating housing having a reentrant wall defining an aperture through the housing for accommodating a camera lens piece, external electric contacts on the back of and extending into the housing for connecting the unit to a suitable power source and an assembly in said housing comprising an electrically insulating mounting plate over the contacts and having upstanding conductive supports arranged in a circle around said reentrant wall, an electric discharge flash lamp tube of circular shape mounted on said supports and having electrode chambers extending outwardly therefrom, a conductor of circular shape attached to said supports and extending along the lamp tube with an end thereof wrapped around an electrode chamber to hold the tube against rotation and an annular conductive reflector mounted on said plate in back of said lamp facing the opening in said housing and providing openings for the conductive supports which it connects together and a current lead passing through said plate and connecting said reflector to a housing contact for conducting an electric charge to said reflector, the lamp supports and the circular conductor for facilitating the starting of the discharge in the lamp.

4. In a photographic lamp unit for mounting on a camera lens board, the combination of an open face electrically insulating housing having a reentrant wall defining an aperture through the housing for accommodating a camera lens piece, external electric contacts on the back of and extending into the housing for connecting the unit to a suitable power source and an assembly in said housing comprising an electrically insulating mounting plate over the contacts and having upstanding conductive supports arranged in a circle around said reentrant wall, an electric discharge flash lamp tube of circular shape mounted on said supports and having electrode chambers extending outwardly therefrom, and electric terminals on said chambers, a conductor of circular shape attached to said supports and extending along the lamp tube with an end thereof wrapped around an electrode chamber to hold the tube against rotation and an annular conductive reflector mounted on said plate in back of said lamp facing the opening in said housing and providing openings for the conductive supports which it connects together, and current leads connecting said lamp terminals and said reflector to said housing contacts, the lamp terminal leads being separated from said reflector and the lead therefor by the insulating plate to avoid short circuits between parts of the unit charged to different potentials.

5. In a photographic lamp unit for mounting on a camera lens board, the combination of an open face electrically insulating housing having spaced electric contact pins projecting therefrom and an opaque reentrant wall defining a light-transmitting aperture therethrough for accommodating camera lens and an assembly in said housing comprising an electrically insulating mounting plate, a circular electric discharge flashlamp, an annular electrically conducting reflector for said lamp, electrically conducting lamp supports secured to said plate and extending through and electrically engaging said reflector, and current leads connecting said reflector and the terminals of said lamp to said housing contact pins, said housing having a removable transparent cover clamping said assembly in position about said reentrant wall with the reflector facing the cover.

EDWARD B. NOEL.

REFERENCES CITED

The following references are of record in the file of this patent:

UNITED STATES PATENTS

| Number | Name | Date |
|---|---|---|
| 1,255,265 | Zachara | Feb. 5, 1918 |
| 1,736,012 | Parcell | Nov. 19, 1929 |
| 2,216,993 | Von Wedel | Oct. 8, 1940 |

FOREIGN PATENTS

| Number | Country | Date |
|---|---|---|
| 4,187 | Great Britain | 1914 |
| 235,202 | Great Britain | Feb. 4, 1926 |